Oct. 1, 1935.                T. CUMMINGS                2,016,135

METHOD OF MAKING A CATALYST

Filed May 27, 1931

INVENTOR
Tom Cummings
BY
ATTORNEY

Patented Oct. 1, 1935

2,016,135

UNITED STATES PATENT OFFICE 2,016,135

METHOD OF MAKING A CATALYST

Tom Cummings, Brooklyn, N. Y., assignor to General Chemical Company, New York, N. Y., a corporation of New York Application May 27, 1931, Serial No. 540,278

2 Claims. (Cl. 23—234)

This invention relates to the manufacture of catalytic material adaptable for use in catalytic oxidation processes. Generally speaking, the invention is directed to a method for making a vanadium catalyst adaptable for use in connection with the production of sulfuric anhydride from gases containing sulfur dioxide and oxygen by the well known contact processes. While in preferred embodiments, the invention looks to the production of a catalyst in which vanadium is the principal catalytically active substance, the invention is more particularly concerned with the physical structure of the final product rather than with the specific nature of the catalytically active substance contained in the catalyst.

Heretofore, catalysts employed in catalytic oxidation processes have been manufactured in such manner that the material utilized in the converters has been in the form of granules obtained by crushing or otherwise breaking down larger solid lumps of catalytic material, or in the form of pellets or pills made in suitable molding or pelleting machines. In both instances where granules or molded pellets or pills have been employed, the material as it goes into the converters, has a close-grained structure and is of considerable density. The physical structure of the solid particles has been found to be an important factor with respect to the activity of the catalyst.

Catalytic material in the form of granules is most generally obtained by evaporating the catalytic mix down to dryness, and then breaking the solid mass into particles or granules of suitable size. The granules are dense and close-grained irrespective of the degree of crushing or the final size of the granules for the reason that the original lumps before crushing are necessarily dense because of the manner of reducing the catalytic mix to dryness. Where the product for use in the converters has been molded and pressed into pellets, the result is that the material is even more dense than where the solid mass of catalytic material after reduction to dryness is ground down to suitable size. The density of material employed in the converters as distinguished from the size of the individual catalytic aggregates has a direct bearing on the activity of the catalyst, the more dense the material, the less is its activity because of the inability of reacting gases to readily contact more than the outer surfaces of the particles.

The primary object of the present invention lies in the provision of a method for producing a porous catalytic material according to which the final product is formed in such manner that the individual catalytic aggregates are porous and of open-grained structure, and at the same time, the catalytic aggregates as units are sufficiently hard to withstand the weight of the superposed quantities of catalytic material in the converter and thus avoid crushing and the attendant reduction of the areas of the gas passages through the material in the converters. While the primary object of the invention is directed to the production of a catalytic material of increased activity by virtue of its physical structure, a further object lies in the provision of a method for forming a catalyst by which the cost of production is materially reduced to the extent of eliminating cumbersome and unsatisfactory apparatus necessarily involved in granulating, and particularly in molding operations which are now most usually employed.

Generally speaking, the invention comprises the formation of a mix of catalytic material of the desired chemical constituents by any suitable or necessary mode of procedure, the reduction of the moisture content of the mix to a hereinafter described degree, forcing the mix thus reduced to the proper consistency through a die to form the material into short cylinder-like pieces having a porous open-grained structure, drying the material so formed, and preferably subjecting the material to a heat treatment to effect hardening of the catalyst.

Various forms of apparatus are suitable for carrying out the invention. One specific embodiment is illustrated in the accompanying drawing in which.

Figure 1:
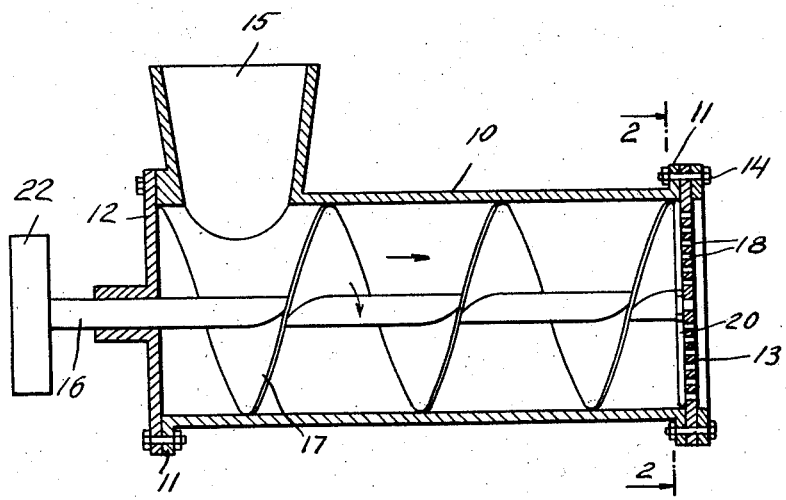
Fig. 1 is a vertical longitudinal section of an extruding device.
Figure 2:
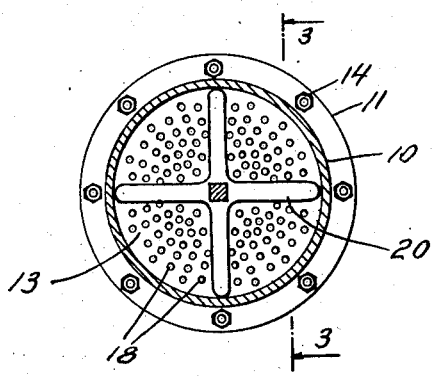
Fig. 2 is a vertical transverse section on the line 2—2 of Fig. 1.
Figure 3:
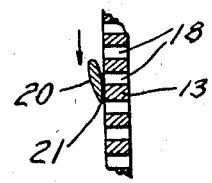
Fig. 3 is a fragmental vertical section on the line 3—3 of Fig. 2, showing the die plate and one blade of a knife.

Referring to the drawing and particularly to Fig. 1, the casing 10 is provided on either end with flanges 11 to facilitate attachment thereto of the end plate 12 and the die plate 13 by means of suitable bolts 14. A feed opening 15 is formed in one end of the casing 10. Journalled in the end plate 12 and the die plate 13 is a shaft 16 having mounted thereon a helicoid feed screw 17. The die plate 13 is provided with a series of die openings or orifices 18 arranged in any suitable manner, for example as shown in elevation in Fig. 2. The orifices are circular and may be of any desirable size, but for purposes of the present invention, diameters ranging from $\frac{1}{16}''$ to $\frac{3}{8}''$ are preferred. Mounted on a squared section of the shaft 16, immediately adjacent and engaging the surface of die plate 13, is a four bladed knife 20 shown in elevation in Fig. 2. The radially extending blades are of the self-sharpening type, and as indicated in Fig. 3 showing one blade in section, are tipped slightly so that a cutting edge 21 is in constant engagement with the inner face of the die plate 13. The shaft 16 may be motor driven through a pulley 22 keyed to the outer end of the shaft.

For illustration only, several examples are given below for forming a satisfactory mix of catalytic material so as to obtain an improved catalyst in accordance with the method of the present invention.

Example I

A mixture of 1000 parts of water and 300 parts of very fine diatomaceous earth is stirred and heated to boiling. 64.1 parts of 95% sulphuric acid are diluted with about 100 parts of water and added to the suspension of diatomaceous earth in water. A mixture of 43 parts of ammonium meta-vanadate, 17.2 parts of potassium hydroxide, 14 parts of sodium hydroxide is dissolved in about 150 parts of water and heated to drive off ammonia. This solution is then slowly added to the rapidly stirred hot suspension of diatomaceous earth in the acidified water. The red sludge resulting is agitated, and evaporated and dried down to a moisture content of 30–40%, and is then ready for treatment as hereafter described.

Example II

Mix 316 parts of kieselguhr, which may previously have been heated to a red heat, with an aqueous solution of 50 parts ammonium vanadate and 56 parts of potassium hydrate. Then agitate the mass, evaporate off so much of the water as is sufficient to reduce the mass to a putty-like consistency containing about 30–40% moisture.

Example III

Mix dry 150 pounds of kieselguhr, which may previously have been heated to a red heat, 10 pounds of gum tragacanth and 20 pounds of potassium sulfate. While agitating the dry mixture of kieselguhr, gum and potassium sulfate, add thereto a sodium vanadate solution prepared by treating 16 pounds of $V_2O_5$ with 10 gallons of water containing therein 11.3 pounds of sodium hydroxide. Dilute the mixture with about 20 gallons of water, and after the mixture has been thoroughly effected add sulfuric acid to substantially neutralize the mix, preferably retaining the mix slightly alkaline. Continue the mixing and evaporate until the moisture content is reduced to about 30–40%. The mix is then ready for treatment in accordance with the present method. In this example, the gum is desirably employed as a binding agent, and other vegetable gums such as gum karaya may be employed.

In the further operation of the invention, a mixture of catalytic material, made for instance in accordance with one of the above examples and having the moisture content most suitable for the particular catalyst involved, is fed into the casing 10 through the opening 15. When the shaft 16 is rotated clockwise, referring to Fig. 2, the material is fed toward and up against the inner face of the die plate 13 by the helicoid feed screw 17. The material is then forced through the openings 18 by the several blades of agitating knife 20 acting in conjunction with the feed screw 17. As the material passes through the orifices 18, the material is still soft, and possibly because of the sudden release of pressure on emerging from the orifices, the individual extrusions, apparently expanding slightly, open up and assume an even porous structure throughout. Where the moisture content of the material has been regulated in accordance with the invention, the separate streams of material issuing from the several orifices curl slightly, and then break off in lengths varying from one to two inches long. This material is collected in suitable containers, and before the material is permitted to dry or harden to any material extent, the containers are shaken gently with the result that the material is broken into short, slightly curled cylinders varying in length from ¼ to ¾ inches. In this condition the material is then completely dried on suitable hot plates.

The catalyst thus obtained may be placed directly in the converters where it is first treated with hot $SO_2$ gases to effect sulfating in the known manner. According to the preferred method of operation, and particularly where an organic gum has been employed as a binding agent, the dried catalyst is heat treated or baked in an oven in an atmosphere of air or $SO_2$ gases at a temperature ranging from about 600° C. to 800° C. for about one hour. This baking process increases the hardness of the material, not affecting, however, the porosity induced by extrusion, so that the catalyst may be used in packing commercial converters without danger of crushing the extruded bodies when the converter is packed to a considerable depth.

In addition to the production of a catalyst having increased activity, a further advantage of the invention is that the catalytic material thereof has a specific gravity much lower than similar finished material produced by pelleting or granulation operations. The result of this is that not only is better conversion obtained than where an equal volume of pelleted or granulated material is employed, but the weight of catalyst necessary to provide a given volume is much less in the case of extruded catalyst than where pelleted or granulated material is utilized.

When working with some catalytic materials it is possible, and many times preferable in order to obtain a product of satisfactory physical structure, to reduce the moisture content of the mix just prior to extrusion operation to some degree other than as set forth in the above specific examples. The best results in each case depend upon the character of the particular material involved. Generally speaking however, it has been found that satisfactory results are not usually obtainable if the moisture content of the mix just prior to the extrusion operation is less than about 30% or greater than about 40%.

The products thus obtained are particularly adaptable for use as catalysts in the production of sulfuric anhydride from gases containing sulfur dioxide and oxygen in the contact process. The present improvements are not limited to the preparation of catalysts employed in the manufacture of sulfuric acid, but may be applied also to catalysts adapted for use in catalytic processes in general, for example, the manufacture of phthalic anhydride, anthraquinone, benzaldehyde, benzoic acid, maleic acid, etc.

I claim:

1. The method of preparing vanadium catalytic material which comprises effecting the formation of a mix comprising silicious material and catalytic material containing vanadium in chemical combination and having a moisture content not substantially less than about 30% and not substantially greater than 40%, forcing the material while subjecting the same to fluctuating pressure through a restricted orifice whereby the formation of porous, extruded bodies of small cross-section is effected, agitating the bodies while moist sufficiently to effect substantial reduction in size of the bodies before permitting any substantial drying or hardening to take place therein, and then drying the material.

2. The method of preparing vanadium catalytic material which comprises effecting the formation of a mix comprising silicious material and catalytic material containing vanadium in chemical combination and having a moisture content not substantially less than about 30% and not substantially greater than 40%, forcing the material while subjecting the same to fluctuating pressure through a restricted orifice whereby the formation of porous, extruded bodies of small cross-section is effected, agitating the bodies while moist sufficiently to effect substantial reduction in size of the bodies before permitting any substantial drying or hardening to take place therein, and then subjecting the material to a heat treatment wherein the temperature is between 600–800° C.

TOM CUMMINGS.